(12) United States Patent
Iguchi

(10) Patent No.: US 10,892,098 B2
(45) Date of Patent: Jan. 12, 2021

(54) MULTILAYER CERAMIC ELECTRONIC COMPONENT

(71) Applicant: TDK CORPORATION, Tokyo (JP)

(72) Inventor: Toshihiro Iguchi, Tokyo (JP)

(73) Assignee: TDK CORPORATION, Tokyo (JP)

(*) Notice: Subject to any disclaimer, the term of this patent is extended or adjusted under 35 U.S.C. 154(b) by 0 days.

(21) Appl. No.: 16/281,773

(22) Filed: Feb. 21, 2019

(65) Prior Publication Data

US 2019/0304694 A1    Oct. 3, 2019

(30) Foreign Application Priority Data

Mar. 27, 2018  (JP) ................................. 2018-060390

(51) Int. Cl.
| | |
|---|---|
| *H01G 4/012* | (2006.01) |
| *H01G 4/12* | (2006.01) |
| *H01G 4/255* | (2006.01) |
| *C04B 35/468* | (2006.01) |
| *H01G 4/30* | (2006.01) |
| *H01G 4/008* | (2006.01) |

(52) U.S. Cl.
CPC ............ *H01G 4/255* (2013.01); *H01G 4/012* (2013.01); *H01G 4/1209* (2013.01); *H01G 4/1227* (2013.01); *H01G 4/1245* (2013.01); *H01G 4/0085* (2013.01); *H01G 4/30* (2013.01)

(58) Field of Classification Search
CPC .... H01G 4/1227; H01G 4/1245; C04B 35/49; C04B 35/4682
See application file for complete search history.

(56) References Cited

U.S. PATENT DOCUMENTS

| | | | | |
|---|---|---|---|---|
| 4,855,266 | A   * | 8/1989  | Burn ................... | C04B 35/4682 501/138 |
| 7,262,146 | B2 * | 8/2007  | Ito ....................... | C04B 35/4682 361/321.4 |
| 7,307,828 | B2 * | 12/2007 | Ito ....................... | C04B 35/4682 361/321.4 |
| 10,650,966 | B2 * | 5/2020  | Iguchi ................. | H01G 4/015 |
| 2006/0046922 | A1 * | 3/2006  | Ito ....................... | C04B 35/6303 501/138 |
| 2010/0046140 | A1 * | 2/2010  | Yamaguchi ........... | B82Y 30/00 361/321.4 |

(Continued)

FOREIGN PATENT DOCUMENTS

| | | | | |
|---|---|---|---|---|
| CN | 101377980 | A | 3/2009 | |
| GB | 2247014 | A * | 2/1992 | ........ C04B 35/4684 |
| JP | 2014-053589 | A | 3/2014 | |

*Primary Examiner* — Karl E Group
(74) *Attorney, Agent, or Firm* — Oliff PLC

(57) ABSTRACT

A multilayer ceramic electronic component includes an element body in which dielectric layers and internal electrode layers having different polarities are laminated alternately. The dielectric layers contain a main component of a perovskite-type compound represented by $(Ba_{1-a-b}Sr_aCa_b)_m(Ti_{1-c-d}Zr_cHf_d)O_3$. $0.94 < m < 1.1$, $0 \le a \le 1$, $0 \le b \le 1$, $0 \le c \le 1$, and $0 \le d \le 1$ are satisfied. The dielectric layers contain a first sub-component of 2.5 mol or more to the main component of 100 mol. The first sub-component contains a boron oxide and/or a lithium oxide. The internal electrode layers contain a main component of copper and/or silver.

6 Claims, 2 Drawing Sheets

(56) References Cited

U.S. PATENT DOCUMENTS

| | | | |
|---|---|---|---|
| 2010/0097740 A1* | 4/2010 | Yamaguchi | B82Y 30/00 |
| | | | 361/312 |
| 2012/0252657 A1* | 10/2012 | Sato | C04B 35/4682 |
| | | | 501/139 |
| 2014/0002955 A1* | 1/2014 | Takeoka | C04B 35/4682 |
| | | | 361/321.4 |
| 2014/0063685 A1 | 3/2014 | Lee et al. | |
| 2019/0304681 A1* | 10/2019 | Iguchi | H01G 4/30 |
| 2019/0304687 A1* | 10/2019 | Iguchi | H01G 4/012 |
| 2019/0304693 A1* | 10/2019 | Iguchi | H01G 4/012 |

* cited by examiner

MULTILAYER CERAMIC ELECTRONIC COMPONENT

BACKGROUND OF THE INVENTION

The present invention relates to a multilayer ceramic electronic component such as a multilayer ceramic capacitor.

For example, as described in Patent Document 1, known is a multilayer ceramic capacitor including dielectric layers made mainly of barium titanate and internal electrode layers made mainly of nickel. Such a multilayer ceramic capacitor is used for many applications.

Patent Document 1: Japanese Patent Laid-Open No. 2014-053589

BRIEF SUMMARY OF INVENTION

However, the present inventor has found that when an electric current passes through a capacitor (particularly, a multilayer ceramic capacitor having internal electrode layers made mainly of nickel) after a short-circuit is generated by, for example, high voltage or mechanical stress, the capacitor may be feverish and thereby heat a mounting substrate.

The present invention has been achieved under such circumstances. It is an object of the invention to provide a multilayer ceramic electronic component, such as a multilayer ceramic capacitor, capable of maintaining insulation properties even if an electric current passes through a capacitor after a short-circuit is generated by, for example, high voltage or mechanical stress.

To achieve the above-described object, a multilayer ceramic electronic component according to the present invention includes an element body in which dielectric layers and internal electrode layers having different polarities are laminated alternately, wherein the dielectric layers contain a main component of a perovskite-type compound represented by $(Ba_{1-a-b}Sr_aCa_b)_m(Ti_{1-c-d}Zr_cHf_d)O_3$, $0.94 < m < 1.1$, $0 \leq a \leq 1$, $0 \leq b \leq 1$, $0 \leq c \leq 1$, and $0 \leq d \leq 1$ are satisfied, the dielectric layers contain a first sub-component of 2.5 mol or more to the main component of 100 mol, the first sub-component contains a boron oxide and/or a lithium oxide, and the internal electrode layers contain a main component of copper and/or silver.

In the multilayer ceramic electronic component according to the present invention, the dielectric layers contain a predetermined main component and the first sub-component, and the internal electrode layers contain a main component of copper and/or silver.

Since such conditions are satisfied, the multilayer ceramic electronic component according to the present invention can restore insulation properties (self-repairing properties) by passing an electric current through the electronic component after a short-circuit is generated by, for example, high voltage or mechanical stress. Thus, insulation is secured even if an electric current passes through the short-circuited electronic component once again, and the multilayer ceramic electronic component according to the present invention is thereby unlikely to be feverish.

Incidentally, the following reason is conceivable for why insulation is recovered by flowing an electric current once again through the short-circuited multilayer ceramic capacitor. That is, insulation is conceivably recovered in such a manner that when the above-mentioned conditions are satisfied, an electric current flows once again through a portion where the internal electrode layers are short-circuited, and the internal electrodes are thereby melted and scattered.

Since the dielectric layers contain the first sub-component, the dielectric layers can be sintered at a low temperature, and a multilayer ceramic electronic component having internal electrodes of Cu can easily be manufactured.

Preferably, the dielectric layers contain a second sub-component, and the second sub-component contains an oxide of Mn and/or Cr. This structure increases a CR product of the multilayer ceramic capacitor.

Preferably, the dielectric layers contain a third sub-component, the third sub-component is an oxide of a rare earth element R, and the R is at least one of Sc, Y, La, Ce, Pr, Nd, Sm, Eu, Gd, Tb, Dy, Ho, Er, Tm, Yb, and Lu. This structure increases a high-temperature load lifetime (HALT).

Preferably, the dielectric layers contain a fourth sub-component, and the fourth sub-component is an oxide of Mg. This structure further increases a high-temperature load lifetime (HALT).

DETAILED DESCRIPTION OF INVENTION

The present is described below with reference to an embodiment illustrated in the figures.

Overall Configuration of Multilayer Ceramic Capacitor

An overall configuration of a multilayer ceramic capacitor is described as an embodiment of a multilayer ceramic electronic component of the present invention.

Figure 1:
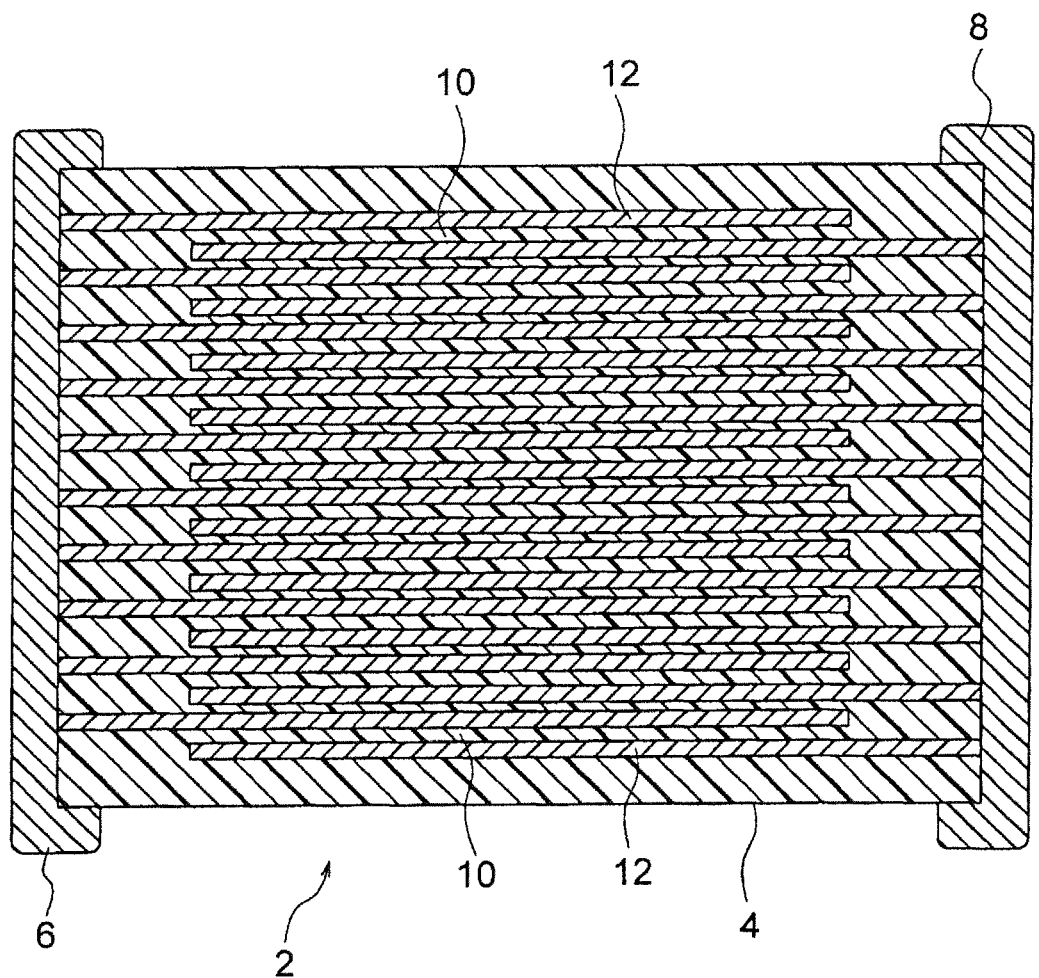
FIG. 1 is a schematic cross-sectional view of a multilayer ceramic capacitor according to an embodiment of the present invention.

As shown in FIG. 1, a multilayer ceramic capacitor 2 according to the embodiment includes an element body 4, a first terminal electrode 6, and a second terminal electrode 8. The element body 4 includes dielectric layers 10 and internal electrode layers 12, and the internal electrode layers 12 are laminated alternately between the dielectric layers 10.

A portion where the dielectric layers 10 and the internal electrode layers 12 are laminated alternately corresponds to an interior region (capacity region). The element body 4 includes exterior regions on both end surfaces in a laminating direction thereof. The exterior regions are made of dielectric layers that are thicker than the dielectric layers 10 constituting the interior region.

The internal electrode layers 12 alternately laminated on one side are electrically connected to the inside of the first terminal electrode 6 formed outside a first end portion of the element body 4 in the X-axis direction. The internal electrode layers 12 alternately laminated on the other side are electrically connected to the inside of the second terminal electrode 8 formed outside a second end portion of the element body 4 in the X-axis direction.

The dielectric layers 10 constituting the capacity region and the dielectric layers constituting the exterior regions may be made of the same material or different materials.

The dielectric layers 10 of the present embodiment contains a main component of a perovskite-type compound represented by $(Ba_{1-a-b}Sr_aCa_b)_m(Ti_{1-c-d}Zr_cHf_d)O_3$.

Containing a main component of a perovskite-type compound represented by $(Ba_{1-a-b}Sr_aCa_b)_m(Ti_{1-c-d}Zr_cHf_d)O_3$ means that a content ratio of the perovskite-type compound represented by $(Ba_{1-a-b}Sr_aCa_b)_m(Ti_{1-c-d}Zr_cHf_d)O_3$ is 90 wt % or more in the dielectric layers 10.

"m" is an element ratio of A-site and B-site, and $0.94 < m < 1.1$ is satisfied. "a" is an element ratio of Sr, and $0 \leq a \leq 1$ is satisfied. "b" is an element ratio of Ca, and $0 \leq b \leq 1$ is satisfied. "c" is an element ratio of Zr, and $0 \leq c \leq 1$ is satisfied. "d" is an element ratio of Hf, and $0 \leq d \leq 1$ is satisfied. In this structure, insulation is easily repaired after the multilayer ceramic capacitor 2 is short-circuited.

The dielectric layers 10 contain a first sub-component of 2.5 mol or more to the main component of 100 mol, and the first sub-component contains a boron oxide and/or a lithium oxide. In this structure, insulation is easily repaired after the multilayer ceramic capacitor 2 is short-circuited. An example of the boron oxide is $B_2O_3$. An example of the lithium oxide is $Li_2O$.

From the above point of view, the dielectric layers 10 preferably contain the first sub-component of 2.5 to 20 mol (more preferably 2.5 to 10 mol) to the main component of 100 mol. Preferably, the first sub-component contains $B_2O_3$.

Preferably, the dielectric layers 10 contain a second sub-component. The second sub-component contains an oxide of Mn and/or Cr. This structure increases a CR product of the multilayer ceramic capacitor 2.

From the above point of view, the dielectric layers 10 preferably contain the second sub-component of 0.1 to 2 mol (more preferably 0.2 to 1 mol) to the main component of 100 mol. Preferably, the second sub-component contains MnO.

Preferably, the dielectric layers 10 contain a third sub-component. The third sub-component is an oxide of a rare earth element R. The R is at least one of Sc, Y, La, Ce, Pr, Nd, Sm, Eu, Gd, Tb, Dy, Ho, Er, Tm, Yb, and Lu. This structure can increase a high-temperature load lifetime of the multilayer ceramic capacitor 2.

From the above point of view, the dielectric layers 10 preferably contain the third sub-component of 0.05 to 3 mol (more preferably 0.1 to 2 mol) of to 100 mol of the main component.

Preferably, the dielectric layers 10 contain a fourth sub-component. The fourth sub-component is an oxide of Mg. This structure can increase a high-temperature load lifetime of the multilayer ceramic capacitor 2.

From the above point of view, the dielectric layers 10 preferably contain the fourth sub-component of 0.1 to 3 mol (more preferably 0.2 to 2 mol) to the main component of 100 mol.

For example, other sub-components that may be contained in the dielectric layers 10 are at least one of $SiO_2$, CaO, $ZrO_2$, BaO, and SrO, at least one of $V_2O_5$, $MoO_3$, and $WO_3$, or the like. For example, these other sub-components of 0 to 10 mol (preferably 0 to 5 mol) may be contained to barium titanate of 100 mol.

The internal electrode layers 12 contains a main component of copper (Cu) and/or silver (Ag). Containing a main component of (Cu) and/or silver (Ag) means that an alloy containing these metals may be included as a main component. Moreover, containing a main component of copper (Cu) and/or silver (Ag) means that a proportion of copper, silver, or a copper-silver alloy contained in the internal electrode layers 12 is 80 wt % or more. The internal electrode layers 12 may contain elements other than copper, silver, or the copper-silver alloy.

The alloy containing copper (Cu) and/or silver (Ag) may be any alloy, such as Ag—Pd alloy.

The terminal electrodes 6 and 8 are made of any materials, but may normally be made of at least one of Ni, Pd, Ag, Au, Cu, Pt, Rh, Ru, Ir, etc, or an alloy of these elements. The terminal electrodes 6 and 8 are normally made of Cu, Cu alloy, Ni, Ni alloy, Ag, Pd, Ag—Pd alloy, Ag—Pd—Cu, or the like. Each of the terminal electrodes 6 and 8 may be composed of multilayer electrodes.

For example, each of the terminal electrodes 6 and 8 may include a three-layer structure of a copper paste baked electrode film, a nickel plated film, and a zinc plated film or a two-layer structure of a copper paste baked electrode film and a baked electrode film containing a main component of silver, from the inner side in contact with the element body 4. Alternatively, each of the terminal electrodes 6 and 8 may include a resin electrode film made of a resin and metal particles.

The shape and the size of the multilayer ceramic capacitor 2 are determined as appropriate according to the object and the application. When the multilayer ceramic capacitor 2 has a cuboid shape, the length in the X-axis direction is normally 0.4 mm to 5.7 mm, but the length in the X-axis direction is preferably 1 mm to 3.2 mm in the present embodiment.

The height (length in the Z-axis direction) of the multilayer ceramic capacitor 2 varies depending on the number of laminated layers in the dielectric layers 10 and the internal electrode layers 12 and is normally 0.2 mm to 3.2 mm, but is preferably 0.5 mm to 2.5 mm in the present embodiment. The multilayer ceramic capacitor 2 normally has a length of 0.2 mm to 5.0 mm in the Y-axis direction, but preferably has a length of 0.5 mm to 2.5 mm in the Y-axis direction in the present embodiment.

In FIG. 1, the thickness of the terminal electrodes 6 and 8 is illustrated to be thicker than the actual thickness for the sake of simple illustration, but the actual thickness of the terminal electrodes 6 and 8 is respectively on the order of 10 μm to 50 μm, which is extremely thinner than the length in the X-axis direction. In the figures, the X-axis, the Y-axis, and the Z-axis are perpendicular to each other, the Z-axis corresponds to the laminating direction of the dielectric layers 10 and the internal electrode layers 12, and the X-axis direction corresponds to a direction where the terminal electrodes 6 and 8 face each other.

The thickness of each of the dielectric layers 10 is normally several μm to several tens of μm, but is preferably 0.5 μm to 20 μm in the present embodiment. The thickness of the internal electrode layers 12 is preferably 0.7 μm to 3 μm.

Figure 2:
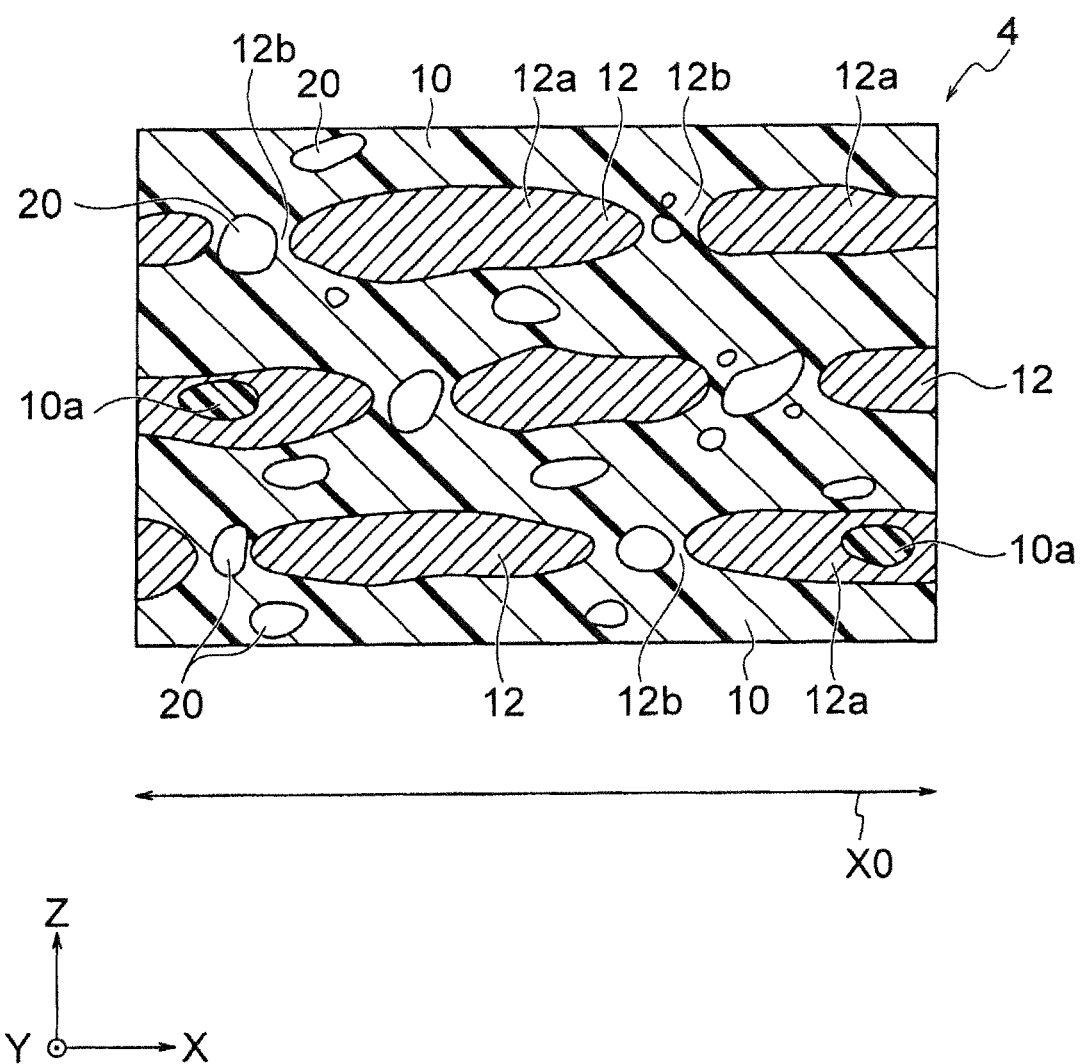
FIG. 2 is a schematic view of an enlarged cross-sectional photograph of a multilayer structure of internal electrode layers and dielectric layers in the multilayer ceramic capacitor shown in FIG. 1.

In the embodiment, when a picture of a cross section (a cross section parallel to the Z-axis) of the multilayer ceramic capacitor 2 shown in FIG. 1 is taken as shown in FIG. 2, the following characteristics appear on the cross section of the internal electrode layers 12 within an imaging range of (10 to 50 μm)×(10 to 50) μm, for example. That is, each of the internal electrode layers 12 does not continue over the entire plane of the X-axis and the Y-axis in the cross section, but includes electrode-present areas 12a appearing intermittently via a plurality of electrode-absent areas 12b. In the electrode-present areas 12a, conductive particles constituting the internal electrode layers 12 continue in a plane direction of the X-axis and the Y-axis.

In the present embodiment, when the element body 4 is cut in a direction substantially perpendicular to the internal electrode layers 12 so as to observe a cut surface, the electrode-present areas 12a and the electrode-absent areas 12b are arranged alternately in a predetermined length X0 along a longitudinal direction (the X-axis direction, the Y-axis direction, or an intermediate direction therebetween), and at least two of the electrode-absent areas 12b are provided, in the internal electrode layers 12.

In the cut surface, the electrode-absent areas 12b appear intermittently in the longitudinal direction of the internal electrode layers 12 and do not contain the conductive particles. In this structure, insulation properties easily recover after the multilayer ceramic capacitor 2 is short-circuited, and an initial capacitance (a capacitance before the short-circuit) can be increased.

From the above point of view, in the embodiment, each of the internal electrode layers 12 preferably includes two to five electrode-absent areas 12b in the predetermined length X0 in the longitudinal direction.

The electrode-absent area 12b includes an area where adjacent dielectric layers are connected by dielectric particles constituting the dielectric layers 10 and an area where voids 20 (neither the dielectric particles nor the conductive particles exist) exist. Incidentally, the voids 20 also exist in the dielectric layers 10. The internal electrode layers 12 may contain dielectric particles 10a.

In each of the internal electrode layers 12, the electrode-absent areas 12b are not formed continuously in the X-axis direction, the Y-axis direction, or in a plane direction therebetween, but appear like islands in a plane (X-Y axes plane) of each of the internal electrode layers 12. Thus, the electrode-present areas 12a of each of the internal electrode layers 12 are connected in any transverse cross section (cut surface) and are continuous in the X-axis direction and the Y-axis direction as a whole as shown in FIG. 1. A width of each of the electrode-absent areas 12b in the X-axis direction or in the Y-axis direction (or a width in the intermediate direction between the X-axis and the Y-axis) is about 1 to 10 times larger than a thickness of each of the internal electrode layers 12.

Incidentally, the following reason is conceivable for why insulation is recovered by flowing an electric current once again through the short-circuited multilayer ceramic capacitor 2. That is, insulation is conceivably recovered in such a manner that when the above-mentioned conditions are satisfied, an electric current flows once again through a portion where the internal electrode layers 12 are short-circuited, and the internal electrodes are thereby melted and scattered.

Any voltage is selected for a high voltage that causes the short-circuit, but this high voltage is 2.5 times or higher than a rated voltage (10V to 630V) of the multilayer ceramic capacitor 2.

In the present embodiment, the number of the electrode-absent areas 12b in the predetermined length X0 in the longitudinal direction (the X-axis direction, the Y-axis direction, or the intermediate direction therebetween) of the outermost internal electrode layers 12 in the laminating direction (Z-axis direction) is larger than that of the center portion of the internal electrode layers 12 in the laminating direction shown in FIG. 1. For example, Ec/Ee is preferably smaller than 1 (more preferably 0.2 to 0.8), where Ec is the number of the electrode-absent areas in the center portion of the laminating direction, and Ee is the number of the electrode-absent areas in the outermost layer of the laminating direction.

The internal electrode layers 12 are more easily short-circuited at the outermost layer in the laminating direction than at the center portion in the laminating direction. Thus, when the internal electrode layers 12 are short-circuited on the outermost layer in the laminating direction, insulation can easily be recovered at the short-circuited site by increasing the number of the electrode-absent areas in the internal electrode layers 12 on the outermost layer in the laminating direction. In the internal electrode layers 12 located in the center portion in the laminating direction, the initial capacitance can be increased by comparatively reducing the number of the electrode-absent areas.

In the present embodiment, the electrode-present areas 12a of the internal electrode layers 12 contain the dielectric particles 10a containing a main component of barium titanate as shown in FIG. 2. In this structure, insulation properties are easily recovered after the short-circuit. In the present embodiment, the electrode-absent areas 12b of the internal electrode layers 12 contain the voids 20. In this structure, insulation properties are easily recovered after the short-circuit. In the present embodiment, the voids 20 are also contained in the dielectric layers 10.

The voids 20 have any size, but preferably have a cross-section-converted diameter of 0.2 μm to 3 μm. Incidentally, the cross-section-converted diameter is a diameter of a circle having a cross-sectional area equivalent to a measured cross-sectional area of the voids 20 on the cross section.

In the present embodiment, an area ratio of the voids 20 contained in the internal electrode layer 12 on the outermost layer in the laminating direction is larger than that in the center portion of the internal electrode layers 12 in the laminating direction. For example, Vc/Ve is preferably smaller than 1 (more preferably, 0.2 to 0.8), where Vc is an area ratio of the voids 20 with respect to an area of the internal electrode layers 12 in the center portion in the laminating direction, and Ve is an area ratio of the voids 20 with respect to an area of the internal electrode layer 12 on the outermost layer in the laminating direction. In this structure, insulation properties are easily recovered after the short-circuit. This is probably because heat is not easily dispersed outward from the element body 4 if the voids contained in the internal electrode layers 12 on the outermost layer in the laminating direction have a large area ratio.

In the present embodiment, when the element body 4 is cut in a direction substantially perpendicular to the internal electrode layers 12 so as to observe a cut surface, an exterior void ratio RSe is larger than an capacity void ratio RSc, where the exterior void ratio RSe is an area ratio of the voids 20 contained in the exterior regions, and the capacity void ratio RSc is an area ratio of the voids 20 contained in the capacity region. Rse/RSc is larger than 1 (preferably, 1.1 to 2). When RSe/RSc is too small, the advantageous effect of the present embodiment is small. When RSe/RSc is too large, the capacity region may not be protected sufficiently by the exterior regions.

The exterior void ratio RSe is obtained by observing freely selected nine cross sections in the exterior regions (cross-sectional view of 50 μm×50 μm each), obtaining area ratios of the voids 20 in the respective cross-sectional views, and obtaining an average of the obtained area ratios. The capacity void ratio RSc is obtained by observing freely selected nine cross sections in the capacity region (cross-sectional view of 50 μm×50 μm each), obtaining area ratios of the voids 20 in the respective cross-sectional views, and obtaining an average of the obtained area ratios. In the capacity region, the voids 20 appear both in the dielectric layers 10 and the internal electrode layers 12. In the exterior regions, however the voids 20 appear only in the dielectric layers.

In the present embodiment, it is particularly preferred that an amount of boron (Bs) contained in the dielectric layers 10 located near the outer surface of the element body 4 shown in FIG. 1 is preferably smaller than an amount of boron (Bc) contained in the dielectric layers 10 located at a central portion of the element body 4. In this structure, a deflection strength or a crack strength of the multilayer ceramic capacitor 2 is improved because, among others, a joint strength between the terminal electrodes 6 and 8 and the element body 4 is improved, and defects such as lowering of the strength of the outer surface due to a reaction of boron contained in the outer surface with moisture in the air are likely to be reduced. Preferably, the content ratio Bs/Bc is 0.5 to 0.95. To adequately control the content ratio Bs/Bc, controlled are a debinding time, a sintering time, an annealing time, etc. of the element body 4. The longer these times, the smaller the content ratio Bs/Bc tends to be.

Method of Manufacturing Multilayer Ceramic Capacitor

Next, a method of manufacturing the multilayer ceramic capacitor 2 is described as an embodiment of the present invention.

A paste for dielectric layers is initially prepared so as to manufacture green sheets that will constitute the dielectric layers 10 shown in FIG. 1 after sintering.

The paste for dielectric layers is normally made of an aqueous paste or an organic-solvent-based paste obtained by kneading a ceramic powder with an organic vehicle.

A raw material of the ceramic powder may be selected as appropriate from various compounds such as composite oxide or an oxide, for example, from a carbonate, a nitrate, a hydroxide, an organometallic compound and the like, which constitutes the above-described dielectric layers 10, and these various compounds can be mixed for use. In the present embodiment, the raw material of the ceramic powder used is preferably a powder having an average grain size of about 0.01 to 1 um. To obtain an extremely thin green sheet, preferably used is a powder that is finer than the thickness of the green sheet.

The organic vehicle is an organic solvent in which a binder is dissolved. The binder used for the organic vehicle may be any binder and be selected appropriately from normally used various binders, such as acrylic and ethyl cellulose.

The organic solvent to be used may be any solvent and be selected from various organic solvents, such as terpineol, butyl carbitol, alcohol, methyl ethyl ketone, acetone, and toluene, depending on the method to be used (e.g., printing method and sheet method).

If necessary, the paste for dielectric layers may be added with an additive selected from various dispersants, plasticizes, dielectrics, sub-component chemical compound, glass frit, insulators, and the like.

Examples of the plasticizer include phthalic acid esters (e.g., dioctyl phthalate and benzylbutyl phthalate), adipic acid, phosphoric esters, and glycols.

Subsequently prepared is a paste for internal electrode layers for forming the internal electrode layers 12 shown in FIG. 1. The paste for internal electrode layers is prepared by kneading conductive materials made of the above-described various conductive metals or alloys with the above-described organic vehicle. Instead of conductive materials, oxides, organometallic compound, resinate, or the like may also be used. The oxide, the organometallic compound, and the resinate described above will be the above-described conductive material after firing. If necessary, the paste for internal electrode layers may contain an inhibitor of ceramic powder (e.g., barium titanate powder). The inhibitor prevents the conductive powder from being sintered in the sintering step.

Using the paste for dielectric layers and the paste for internal electrode layers adjusted in the above-described step, the green sheets serving as the dielectric layers 10 after sintering and the internal electrode pattern layers serving as the internal electrode layers 12 after sintering are laminated alternately to manufacture an internal multilayer body serving as the interior region after sintering as shown in FIG. 1. After or before the internal multilayer body is manufactured, green sheets serving as the dielectric layers in the exterior regions after sintering is formed using the paste for dielectric layers.

Specifically, the green sheets are formed on carrier sheets (e.g. PET film) as a support by a doctor blade method or so. The green sheets are dried after having been formed on the carrier sheets.

Next, the internal electrode pattern layers are formed on the surface of the green sheets formed in the above step using the paste for internal electrode layers, and green sheets having the internal electrode pattern layers are obtained. Then, the obtained green sheets each having the internal electrode pattern layer are laminated alternately to obtain the internal multilayer body. The internal electrode pattern layers are formed by any method, such as printing method and transfer method. The green sheets each having the internal electrode pattern layers may be laminated via adhesive layers.

The green sheets serving as the dielectric layers in the exterior regions (outer green sheets) are formed on the carrier sheets as a support in the same manner as the green sheets serving as the interior region (inner green sheets). The outer green sheets are formed on the carrier sheets and are thereafter dried. Incidentally, the outer green sheets are sufficiently thick than the inner green sheets.

Instead of laminating the internal multilayer body on the outer green sheets, the inner green sheets and the internal electrode pattern layers may alternately be laminated directly on the outer green sheets by a predetermined number of layers. Alternatively, multilayer body units formed by alternately laminating a plurality of inner green sheets and a plurality of internal electrode pattern layers may be prepared in advance and laminated on the outer green sheets by a predetermined number of layers.

The obtained green multilayer body is cut to a predetermined size along cutting lines, for example, to form green chips. The green chips are dried and solidified for removal of plasticizer and are thereby solidified. The solidified and dried green chips are loaded into a barrel container together with media and polishing liquid and are subjected to barrel polishing by a horizontal centrifugal barrel machine. The green chips after having been subjected to the barrel polishing are washed with water and dried.

The dried green chips are debindered, sintered, and if necessary, annealed, and the element body 4 shown in FIG. 1 is thereby obtained. When the internal electrode pattern layers serving as the internal electrode layers 12 contain copper, the temperature for sintering is preferably lower than 1085° C. (melting point of copper), that is, a temperature of 900° C. to 1080° C. is preferable. When the internal electrode pattern layers serving as the internal electrode layers 12 contains silver, the temperature for sintering is preferably lower than 962° C. (melting point of copper), that is, a temperature of 800° C. to 960° C. is preferable.

The sintered body (element body 4) thus obtained is subjected to edge polishing by barrel polishing or so, and the terminal electrodes 6 and 8 are formed by baking the paste for terminal electrodes. If necessary, a pad layer is formed on the terminal electrodes 6 and 8 by plating. The paste for terminal electrode layers is prepared in the same manner as the above-described paste for internal electrode layers.

The multilayer ceramic capacitor 2 manufactured in this manner is mounted on a printed board by soldering or so and is used for various electronic apparatuses.

The present invention is not limited to the above-described embodiment and may variously be modified within the scope of the present invention.

For example, the multilayer ceramic electronic component of the present invention is not limited to the multilayer ceramic capacitor, but may be applied to any other multilayer ceramic electronic components in which dielectric layers are laminated via internal electrodes, such as band-pass filters, multilayer three terminal filters, piezoelectric elements, PTC thermistors, NTC thermistors, and varistors.

EXAMPLES

The present invention is described based on further detailed examples, but the present invention is not limited to these examples.

Sample No. 4

Powders of $(Ba_{1-a-b}Sr_aCa_b)_m(Ti_{1-c-d}Zr_cHf_d)O_3$ (m=1, a=0, b=0, c=0, and d=0) having a grain size of 0.05 to 1 μm were initially prepared as raw material powders of a main raw material. Then, $B_2O_3$ was prepared as first sub-components. Incidentally, the sub-components were preliminarily pulverized to have a grain size of about 0.02 to 0.5 μm, which was smaller than grain sizes of the raw material powders of the main raw material.

Next, weighed was 2.5 mol of the $B_2O_3$ powder to 100 mol of each of the raw material powders prepared as mentioned above. The powders were wet-mixed and dried in a ball mill. Then, a dielectric raw material was obtained.

100 parts by weight of the obtained dielectric raw materials, 7 parts by weight of acrylic resin, 4 parts by weight of butyl benzyl phthalate (BBP) as a plasticizer, 80 parts by weight of methyl ethyl ketone as a solvent were subsequently mixed in a ball mill and turned into a paste for dielectric layers.

Separately from the above, 56 parts by weight of Cu particles, 40 parts by weight of terpineol, 4 parts by weight of ethyl cellulose, and 1 part by weight of benzotriazole were kneaded in a triple roll mill and turned into a paste for internal electrode layers. The average particle size of the Cu particles was 1 μm.

Then, green sheets were formed on a PET film using the dielectric paste for dielectric layers prepared in the above-mentioned step. Then, green sheet were formed on a PET film using a dielectric paste for forming exterior regions.

A plurality of green sheets for interior region having the internal electrode layers and green sheets for exterior regions was laminated and adhered by pressure, and a green multilayer body was obtained. Then, the green multilayer body was cut into a predetermined size to obtain green chips.

The obtained green chips were subsequently debindered, fired, and annealed with the following conditions, and sintered bodies were thereby obtained.

In the debinder treatment, the temperature increase rate was 25° C./hour, the retaining temperature was 260° C., the retention time was 8 hours, and the atmosphere was air.

In the firing treatment, the temperature increase rate was 200° C./hour, the retaining temperature was 1000° C., and the retention time was 120 minutes. The cooling rate was 200° C./hour. The atmosphere gas was a humidified mixed gas of $N_2+H_2$, and the oxygen partial pressure was $10^{-9}$ MPa or less.

In the annealing treatment, the temperature increase rate was 200° C./hour, the retaining temperature was 1000° C., the retention time was 10 hours, the cooling rate was 200° C./hour, and the atmosphere gas was a humidified $N_2$ gas (oxygen partial pressure: $10^{-8}$ MPa or less).

A wetter was used to humidify the atmosphere gas during the firing and annealing.

The obtained sintered bodies underwent a barrel polish and were thereafter applied with a Cu paste as a terminal electrode and baked in a reducing atmosphere. Then, a plurality of multilayer ceramic capacitor samples (hereinafter these may simply be referred to as "capacitor samples") according to Sample No. 4 was obtained. The thickness of the dielectric layers was 10 μm. FIG. 2 is a schematically enlarged cross-sectional view of a main part of the capacitor samples according to Sample No. 4.

Sample No. 1

Except for using 56 parts by weight of Ni particles instead of 56 parts by weight of Cu particles, a plurality of capacitor samples according to Sample No. 1 was manufactured in a similar manner to Sample No. 4.

Sample No. 2, Sample No. 3, and Sample No. 15 to Sample No. 17

Except that the amount of $B_2O_3$ powder (sub-component) described in Table 1 was weighed to 100 mol of the main raw material, a plurality of capacitor samples according to Sample No. 2, Sample No. 3, and Sample No. 15 to Sample No. 17 was manufactured in a similar manner to Sample No. 4.

Sample No. 5

Except for using 56 parts by weight of Ag particles instead of 56 parts by weight of Cu particles, a plurality of capacitor samples according to Sample No. 5 was manufactured in a similar manner to Sample No. 4.

Sample No. 6 to Sample No. 14

Except that a powder of $(Ba_{1-a-b}Sr_aCa_b)_m(Ti_{1-c-d}Zr_cHf_d)O_3$ to be represented by the composition in Table 1 was prepared as a raw material powder of a main raw material instead of a powder of $(Ba_{1-a-b}Sr_aCa_b)_m(Ti_{1-c-d}Zr_cHf_d)O_3$ (m=1, a=0, b=0, c=0, and d=0), a plurality of capacitor samples according to Sample No. 6 to Sample No. 14 was manufactured in a similar manner to Sample No. 4.

Sample No. 18

Except that 2.5 mol of $Li_2O$ was weighed instead of 2.5 mol of $B_2O_3$ powder to 100 mol of the main raw material, a plurality of capacitor samples according to Sample No. 18 was manufactured in a similar manner to Sample No. 4.

Sample No. 21

Except for further preparing a second sub-component of $MnCO_3$ and weighing 0.2 mol of the $MnCO_3$ powder to 100 mol of the main raw material, a plurality of capacitor samples according to Sample No. 21 was manufactured in a similar manner to Sample No. 4. $MnCO_3$ would be contained in the dielectric layers 10 as MnO after firing.

Sample No. 22

Except for further preparing a second-subcomponent of $Cr_2O_3$ and weighing 0.2 mol of the $Cr_2O_3$ powder to 100 mol of the main raw material, a plurality of capacitor samples according to Sample No. 22 was manufactured in a similar manner to Sample No. 4.

Sample No. 23 to Sample No. 34

Except for preparing a second-subcomponent of $MnCO_3$ and a third sub-component of an oxide of R described in Table 2 and weighing 0.2 mol of a $MnCO_3$ powder and the amount described in Table 2 of the oxide powder of R with respect to 100 mol of the main raw material, a plurality of capacitor samples according to Sample No. 23 to Sample No. 34 was manufactured in a similar manner to Sample No. 4.

Sample No. 35 and Sample No. 36

Except for further preparing a second-subcomponent of $MnCO_3$, a third sub-component of $Y_2O_3$, and a fourth sub-component of $MgCO_3$ and weighing 0.2 mol of a $MnCO_3$ powder, 2 mol of a $Y_2O_3$ powder, and the amount of $MgCO_3$ described in Table 2 with respect to 100 mol of the main raw material, a plurality of capacitor samples according to Sample No. 35 and Sample No. 36 was manufactured in a similar manner to Sample No. 4. $MgCO_3$ would be contained in the dielectric layers 10 as MgO after firing.

Measurement

The capacitor samples obtained in Sample No. 1 to Sample No. 18 and Sample No. 21 to Sample No. 36 were measured as described below. Results are shown in Table 1 and Table 2.

(Insulation Restoration Properties (Self-Repairing Properties) Test)

A plurality of capacitor samples in each of examples and comparative examples was prepared and applied with voltage (1000V) to forcibly generate the short-circuit of the internal electrodes and achieve 10Ω, or less. These 10 samples were prepared in each of examples and comparative examples and applied with an electric current (2.5 A), and the number of samples whose insulation was restored to 10 kΩ or higher was examined. Results are shown in Table 1 and Table 2. In the item of the insulation restoration in Table 1 and Table 2, the denominator of the numerical value is the number of samples tested, and the numerator is the number of samples whose insulation was restored.

(Cr Product)

The capacitor samples were measured for capacitance C by a digital LCR meter at the base temperature 25° C. with conditions (frequency: 1.0 kHz, input signal level (measurement voltage): 1.0 Vrms). Moreover, the capacitor samples were measured for insulation resistance IR after a DC voltage (25V) was applied for 1 minute at 25° C. using an insulation resistance tester. A CR product was calculated by multiplying the capacitance C (unit: μF) with the insulation resistance IR (unit: MΩ) measured above.

(High-Temperature Load Lifetime (HALT))

A high-temperature load lifetime of each sample was evaluated by holding a DC voltage application state at 180° C. in an electric field (10 V/μm) and measuring an insulation degradation time of each capacitor sample. In the present examples, the lifetime was defined as a duration from the beginning of voltage application for each capacitor sample to the drop of insulation resistance of each capacitor sample by one order. In the present examples, 20 capacitor samples underwent the above-mentioned evaluation and underwent a Weibull analysis for calculation of a mean time to failure (MTTF). This MTTF was defined as an average lifetime of the capacitor samples.

Evaluation

Table 1 shows that self-repairing properties were favorable when the dielectric layers contained 2.5 mol or more of the first sub-component and the internal electrode layers contained the main component of Cu or Ag (Sample No. 4 to Sample No. 18) compared to when the internal electrode layers did not contain a main component of Cu or Ag (Sample No. 1) or when the dielectric layers contained less than 2.5 mol of the first sub-component (Sample No. 2 and Sample No. 3).

Table 2 shows that the CR product was favorable when the dielectric layers contained 2.5 mol or more of the first sub-component and further contained the second sub-component and the internal electrode layers contained a main component of Cu (Sample No 21 and Sample No. 22).

Table 2 shows that the high-temperature load lifetime (HALT) was further favorable when the dielectric layers contained 2.5 mol or more of the first sub-component and further contained the second sub-component and the third sub-component and the internal electrode layers contained a main component of Cu (Sample No. 23 to Sample No. 34).

Table 2 shows that the high-temperature load lifetime (HALT) was further favorable when the dielectric layers contained 2.5 mol or more of the first sub-component and further contained the second sub-component, the third sub-component, and the fourth sub-component and the internal electrode layers contained a main component of Cu (Sample No. 35 to Sample No. 36).

TABLE 1

| Sample No. | Main Component | | | | | Internal Electrodes | First Sub-Component | | Self-Repairing Properties |
| | m | a | b | c | d | | Kind | Addition amount [mol] | |
| --- | --- | --- | --- | --- | --- | --- | --- | --- | --- |
| 1 | 1 | 0 | 0 | 0 | 0 | Ni | $B_2O_3$ | 2.5 | x  0/10 |
| 2 | 1 | 0 | 0 | 0 | 0 | Cu | $B_2O_3$ | 0 | x  0/10 |
| 3 | 1 | 0 | 0 | 0 | 0 | Cu | $B_2O_3$ | 2 | x  0/10 |
| 4 | 1 | 0 | 0 | 0 | 0 | Cu | $B_2O_3$ | 2.5 | ○  10/10 |
| 5 | 1 | 0 | 0 | 0 | 0 | Ag | $B_2O_3$ | 2.5 | ○  10/10 |
| 6 | 0.94 | 0 | 0 | 0 | 0 | Cu | $B_2O_3$ | 2.5 | ○  10/10 |
| 7 | 1.1 | 0 | 0 | 0 | 0 | Cu | $B_2O_3$ | 2.5 | ○  10/10 |
| 8 | 1 | 1 | 0 | 0 | 0 | Cu | $B_2O_3$ | 2.5 | ○  10/10 |
| 9 | 1 | 0 | 1 | 0 | 0 | Cu | $B_2O_3$ | 2.5 | ○  10/10 |
| 10 | 1 | 0 | 0 | 1 | 0 | Cu | $B_2O_3$ | 2.5 | ○  10/10 |
| 11 | 1 | 0 | 0 | 0 | 1 | Cu | $B_2O_3$ | 2.5 | ○  10/10 |
| 12 | 1 | 1 | 0 | 1 | 0 | Cu | $B_2O_3$ | 2.5 | ○  10/10 |
| 13 | 1 | 0 | 1 | 1 | 0 | Cu | $B_2O_3$ | 2.5 | ○  10/10 |
| 14 | 1 | 0.5 | 0.5 | 1 | 0 | Cu | $B_2O_3$ | 2.5 | ○  10/10 |
| 15 | 1 | 0 | 0 | 0 | 0 | Cu | $B_2O_3$ | 5 | ○  10/10 |
| 16 | 1 | 0 | 0 | 0 | 0 | Cu | $B_2O_3$ | 7 | ○  10/10 |
| 17 | 1 | 0 | 0 | 0 | 0 | Cu | $B_2O_3$ | 9 | Δ  5/10 |
| 18 | 1 | 0 | 0 | 0 | 0 | Cu | $Li_2O$ | 2.5 | ○  10/10 |

TABLE 2

| Sample No. | Main Component | | | | | Internal Electrodes | First Sub-Component | | Second Sub-Component | | Third Sub-Component | |
| --- | --- | --- | --- | --- | --- | --- | --- | --- | --- | --- | --- | --- |
| | m | a | b | c | d | | Kind | Addition amount [mol] | Kind | Addition amount [mol] | Kind | Addition amount [mol] |
| 4 | 1 | 0 | 0 | 0 | 0 | Cu | $B_2O_3$ | 2.5 | | | | |
| 21 | 1 | 0 | 0 | 0 | 0 | Cu | $B_2O_3$ | 2.5 | MnO | 0.2 | | |
| 22 | 1 | 0 | 0 | 0 | 0 | Cu | $B_2O_3$ | 2.5 | $Cr_2O_3$ | 0.2 | | |
| 23 | 1 | 0 | 0 | 0 | 0 | Cu | $B_2O_3$ | 2.5 | MnO | 0.2 | Y | 0.1 |
| 24 | 1 | 0 | 0 | 0 | 0 | Cu | $B_2O_3$ | 2.5 | MnO | 0.2 | Gd | 0.1 |
| 25 | 1 | 0 | 0 | 0 | 0 | Cu | $B_2O_3$ | 2.5 | MnO | 0.2 | Tb | 0.1 |
| 26 | 1 | 0 | 0 | 0 | 0 | Cu | $B_2O_3$ | 2.5 | MnO | 0.2 | Dy | 0.1 |
| 27 | 1 | 0 | 0 | 0 | 0 | Cu | $B_2O_3$ | 2.5 | MnO | 0.2 | Ho | 0.1 |
| 28 | 1 | 0 | 0 | 0 | 0 | Cu | $B_2O_3$ | 2.5 | MnO | 0.2 | Yb | 0.1 |
| 29 | 1 | 0 | 0 | 0 | 0 | Cu | $B_2O_3$ | 2.5 | MnO | 0.2 | Y | 2 |
| 30 | 1 | 0 | 0 | 0 | 0 | Cu | $B_2O_3$ | 2.5 | MnO | 0.2 | Gd | 2 |
| 31 | 1 | 0 | 0 | 0 | 0 | Cu | $B_2O_3$ | 2.5 | MnO | 0.2 | Tb | 2 |
| 32 | 1 | 0 | 0 | 0 | 0 | Cu | $B_2O_3$ | 2.5 | MnO | 0.2 | Dy | 2 |
| 33 | 1 | 0 | 0 | 0 | 0 | Cu | $B_2O_3$ | 2.5 | MnO | 0.2 | Ho | 2 |
| 34 | 1 | 0 | 0 | 0 | 0 | Cu | $B_2O_3$ | 2.5 | MnO | 0.2 | Yb | 2 |
| 35 | 1 | 0 | 0 | 0 | 0 | Cu | $B_2O_3$ | 2.5 | MnO | 0.2 | Y | 2 |
| 36 | 1 | 0 | 0 | 0 | 0 | Cu | $B_2O_3$ | 2.5 | MnO | 0.2 | Y | 2 |

| Sample No. | Fourth Sub-Component | | Self-Reparing Properties | CR Product [MΩ μF] | HALT [h] |
| --- | --- | --- | --- | --- | --- |
| | Kind | Addition amount [mol] | | | |
| 4 | | | ○ | 10/10 | 252 | 0.3 |
| 21 | | | ○ | 10/10 | 2415 | 4.2 |
| 22 | | | ○ | 10/10 | 2066 | 3.2 |
| 23 | | | ○ | 10/10 | 2285 | 41.7 |
| 24 | | | ○ | 10/10 | 1693 | 26.7 |
| 25 | | | ○ | 10/10 | 1598 | 31.5 |
| 26 | | | ○ | 10/10 | 1953 | 27.7 |
| 27 | | | ○ | 10/10 | 2604 | 37.1 |
| 28 | | | ○ | 10/10 | 2968 | 19.5 |
| 29 | | | ○ | 10/10 | 2701 | 152.2 |
| 30 | | | ○ | 10/10 | 1794 | 259.9 |
| 31 | | | ○ | 10/10 | 1586 | 189.2 |
| 32 | | | ○ | 10/10 | 2558 | 268.4 |
| 33 | | | ○ | 10/10 | 1804 | 195.6 |
| 34 | | | ○ | 10/10 | 1986 | 119.9 |
| 35 | MgO | 0.2 | ○ | 10/10 | 1742 | 507.7 |
| 36 | MgO | 2 | ○ | 10/10 | 2701 | 945.7 |

DESCRIPTION OF THE REFERENCE NUMERAL

2 . . . multilayer ceramic capacitor
4 . . . element body
6 . . . first terminal electrode
8 . . . second terminal electrode
10, 100 . . . dielectric layer
10a . . . dielectric particle
12, 120 . . . internal electrode layer
12a . . . electrode-present area
12b . . . electrode-absent area
20 . . . void

What is claimed is:

1. A multilayer ceramic electronic component comprising an element body in which dielectric layers and internal electrode layers having different polarities are laminated alternately, wherein
the dielectric layers contain a main component of a perovskite-type compound represented by $(Ba_{1-a-b}Sr_aCa_b)_m(Ti_{1-c-d}Zr_cHf_d)O_3$,
$0.94 < m < 1.1$, $0 \leq a \leq 1$, $0 \leq b \leq 1$, $0 \leq c \leq 1$, and $0 \leq d \leq 1$ are satisfied,
the dielectric layers contain a first sub-component of 2.5 mol or more to the main component of 100 mol, a second sub-component of 0.2 to 1 mol to the main component of 100 mol, and a third sub-component of 0.1 to 2 mol to the main component of 100 mol,
the first sub-component contains a boron oxide and optionally a lithium oxide, and
the second sub-component contains an oxide of Mn and/or Cr,
the third sub-component is an oxide of a rare earth element R,
the R is at least one of Sc, Y, La, Ce, Pr, Nd, Sm, Eu, Gd, Tb, Dy, Ho, Er, Tm, Yb, and Lu,
the internal electrode layers contain a main component of copper and/or silver,
the boron oxide of the first sub-component is present in an amount of 2.5 mol or more to the main component of 100 mol, and
and a content ratio Bs/Bc is 0.5 to 0.95, in which an amount of boron contained in the dielectric layers located near the outer surface of the element body is Bs and an amount of boron contained in the dielectric layers located at a central portion of the element body is Bc.

2. The multilayer ceramic electronic component according to claim 1, wherein
the dielectric layers contain a fourth sub-component, and the fourth sub-component is an oxide of Mg.

3. The multilayer ceramic electronic component according to claim 1, wherein the first sub-component is present in an amount of 2.5 to 20 mol to the main component of 100 mol.

4. The multilayer ceramic electronic component according to claim 1, wherein the first sub-component is present in an amount of 2.5 to 10 mol to the main component of 100 mol.

5. The multilayer ceramic electronic component according to claim 1, wherein the first sub-component is boron oxide.

6. The multilayer ceramic electronic component according to claim 1, wherein a proportion of copper, silver, or a copper-silver alloy contained in the internal electrode layers is 80 wt % or more.

* * * * *